(12) United States Patent
Tamatsu (10) Patent No.: US 9,253,298 B2
(45) Date of Patent: Feb. 2, 2016

(54) PORTABLE INFORMATION TERMINAL HOLDING STAND AND DESK TELEPHONE

(71) Applicant: NEC PLATFORMS, LTD., Kawasaki-shi, Kanagawa (JP)

(72) Inventor: Jun Tamatsu, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 14/423,450

(22) PCT Filed: Sep. 4, 2013

(86) PCT No.: PCT/JP2013/074446
§ 371 (c)(1),
(2) Date: Feb. 24, 2015

(87) PCT Pub. No.: WO2014/050549
PCT Pub. Date: Apr. 3, 2014

(65) Prior Publication Data
US 2015/0304466 A1    Oct. 22, 2015

(30) Foreign Application Priority Data
Sep. 26, 2012  (JP) .................................. 2012-212116

(51) Int. Cl.
*H04M 1/00*     (2006.01)
*H04M 1/04*     (2006.01)
*H04M 1/21*     (2006.01)

(52) U.S. Cl.
CPC . *H04M 1/04* (2013.01); *H04M 1/21* (2013.01)

(58) Field of Classification Search
CPC ........... H04M 1/04; H04M 1/06; H04M 1/21; H04M 1/725
See application file for complete search history.

(56) References Cited

U.S. PATENT DOCUMENTS

2009/0045234 A1*  2/2009  Carnevali ...................... 224/199
2009/0219788 A1*  9/2009  Henley, Jr. ....................... 368/13
(Continued)

FOREIGN PATENT DOCUMENTS

JP     10-200611 A     7/1998
JP     2000-174872 A   6/2000
(Continued)

OTHER PUBLICATIONS

International Search Report of PCT/JP2013/074446 dated Dec. 3, 2013 [PCT/ISA/210].
(Continued)

*Primary Examiner* — Tuan D Nguyen
(74) *Attorney, Agent, or Firm* — Sughrue Mion, PLLC (57) ABSTRACT

A portable information terminal holding stand (10) is configured to hold one of a plurality of types of portable information terminals (30) and (40) having different connector specifications, and to be electrically connected to the held portable information terminal (30) or (40). The portable information terminal holding stand (10) includes: a holding stand main body (11) having a main mounting surface (11a); a terminal cover (12) detachably attached to a lower end of the main mounting surface (11a) and configured to support a lower end of the portable information terminal (30) or (40) mounted on the main mounting surface (11a); and a connector holder (18) configured to hold the holding base side connector (17a). The connector holder (18) includes a plurality of types of connector holders prepared in accordance with specifications of the holding base side connector (17a). The terminal cover (12) includes a holder receiving portion (123) configured to receive and hold the plurality of types of connector holders (18).

10 Claims, 8 Drawing Sheets

(56) References Cited

U.S. PATENT DOCUMENTS

2014/0055933 A1* 2/2014 Wakl et al. ............... 361/679.01
2014/0294173 A1* 10/2014 Bonde ...................... 379/428.02

FOREIGN PATENT DOCUMENTS

| | | |
|---|---|---|
| JP | 2000-253122 A | 9/2000 |
| JP | 2004-023386 A | 1/2004 |
| JP | 2005-341157 A | 12/2005 |
| JP | 3165298 U | 1/2011 |
| JP | 2012-121541 A | 6/2012 |

OTHER PUBLICATIONS

Written Opinion of PCT/JP2013/074446 dated Dec. 3, 2013 [PCT/ISA/237].

* cited by examiner

PORTABLE INFORMATION TERMINAL HOLDING STAND AND DESK TELEPHONE

CROSS REFERENCE TO RELATED APPLICATIONS

This application is a National Stage of International Application No. PCT/JP2013/074446, filed Sep. 4, 2013, claiming priority based on Japanese Patent Application No. 2012-212116, filed Sep. 26, 2012, the contents of all of which are incorporated herein by reference in their entirety.

TECHNICAL FIELD

This invention relates to a portable information terminal holding stand (or base) which is capable of holding a portable information terminal such as a tablet terminal (multifunction portable terminal) and a smartphone (highly functional mobile phone), and which is electrically connected to the portable information terminal held thereon, and also relates to a desk telephone.

BACKGROUND ART

Nowadays, various portable information terminals such as a tablet terminal (multifunction portable terminal) and a smartphone (highly functional mobile phone) are sold in the market. An iPad® is known as a typical example of the tablet terminal (multifunction portable terminal), and an iPhone® is known as a typical example of the smartphone (highly functional mobile phone).

Now, various proposals have been made on a holding stand configured to hold such a portable information terminal, and to be electrically connected to the portable information terminal held on the holding stand.

For example, Japanese Unexamined Patent Application Publication (JP-A) No. 2005-341157 (Patent Document 1) discloses a hybrid IP phone configured to hold a portable terminal. The hybrid IP phone of Patent Document 1 includes a fixed processing apparatus, a portable terminal connection portion formed as a recessed portion in the fixed processing apparatus and configured to fit and hold the portable terminal, and a connection terminal provided at a bottom portion of the portable terminal connection portion and configured to be electrically connected to a power supply terminal of the portable terminal.

PRIOR ART DOCUMENT

Patent Document

Patent Document 1: JP-A-2005-341157

SUMMARY OF THE INVENTION

Problem to be Solved by the Invention

However, with the hybrid IP phone of Patent Document 1, there is a problem in that the type of portable terminal electrically connectable to the hybrid IP phone is limited to only portable terminals having a power supply terminal compliant with the specifications (standards) of the connection terminal that is integrally fixed to the fixed processing apparatus.

Therefore, this invention has been made to solve the problem in the related art. In other words, it is an object of this invention to provide a portable information terminal holding stand capable of handling a plurality of types of portable information terminals having different connector specifications simply and with little effort, and to provide a desk telephone.

Means to Solve the Problem

In order to solve the above-mentioned problem, according to one embodiment of this invention, there is provided a portable information terminal holding stand configured to hold one of a plurality of types of portable information terminals including at least a first portable information terminal including a terminal side connector and a second portable information terminal including a terminal side connector having different specifications from the specifications of the terminal side connector of the first portable information terminal, the portable information terminal holding stand being configured to be electrically connected to the one of the plurality of types of portable information terminals by fitting a holding stand side connector into the terminal side connector of the one of the plurality of types of portable information terminals held thereon, the portable information terminal holding base including: a holding stand main body having a main mounting surface inclined with respect to a horizontal surface; a terminal cover detachably attached to a lower end of the main mounting surface and configured to support a lower end of the one of the plurality of types of portable information terminals mounted on the main mounting surface; and a connector holder configured to hold the holding stand side connector. In the portable information terminal holding stand, the connector holder includes a plurality of types of connector holders prepared in accordance with specifications of the holding stand side connector, and the terminal cover includes a holder receiving portion configured to receive and hold one of the plurality of types of connector holders.

In order to solve the above-mentioned problem, according to one embodiment of this invention, there is provided a desk telephone, including: the above-mentioned portable information terminal holding stand; and a transmission/reception section.

Effect of the Invention

According to the one embodiment of this invention, by preparing the plurality of types of connector holders in accordance with the specifications of the holding stand side connector, the holding stand side connector and the connector holder can be selected in accordance with the connector specifications of the portable information terminal. This structure makes it possible to hold the portable information terminal holding stand through the appropriate holding stand connector by the use of the selected connector holder. Consequently, the plurality of types of portable information terminals having different connector specifications from each other can be easily handled.

Further, according to the one embodiment of this invention, the holder receiving portion configured to receive and hold the connector holder is formed in the terminal cover to be detachably attached to the lower end of the main mounting surface. Therefore, the connector holder can be exchanged from the main mounting surface side, namely, the front surface side of the portable information terminal holding stand. In this invention, the holding stand side connector can be easily exchanged with little effort without lifting up or without turning over the portable information terminal holding stand.

MODE FOR EMBODYING THE INVENTION

A portable information terminal holding stand according to an embodiment of this invention is described below with reference to the drawings.

Note that, in the following description, a fore-and-aft direction (depth direction) extending parallel to a main mounting surface of a holding stand main body is defined as an X-axis direction, a right-and-left direction (width direction, horizontal axis direction) extending parallel to the main mounting surface of the holding stand main body and orthogonal to the X-axis direction is defined as a Y-axis direction, and an up-and-down direction (height direction) orthogonal to the main mounting surface of the holding stand main body is defined as a Z-axis direction.

Embodiment

A portable information terminal holding stand 10 is capable of holding one of a plurality of types of portable information terminals 30 and 40. The portable information terminal holding stand 10 according to this embodiment is capable of selectively holding two types of portable information terminals 30 and 40. Specifically, the portable information terminals include a first portable information terminal 30 illustrated in FIG. 5 and a second portable information terminal 40 illustrated in FIG. 7 having larger length and width dimensions than the first portable information terminal 30.

In addition to a function as a holding stand for the portable information terminals 30 and 40, the portable information terminal holding stand 10 is configured to also function as a battery-charging stand for the portable information terminals 30 and 40, as well as function as a desk telephone capable of working together with the portable information terminals 30 and 40.

In the example of the figures, the first portable information terminal 30 is a smartphone (highly functional mobile phone) such as iPhone, and the second portable information terminal 40 is a tablet terminal (multifunction portable terminal) such as iPad.

Figure 1:
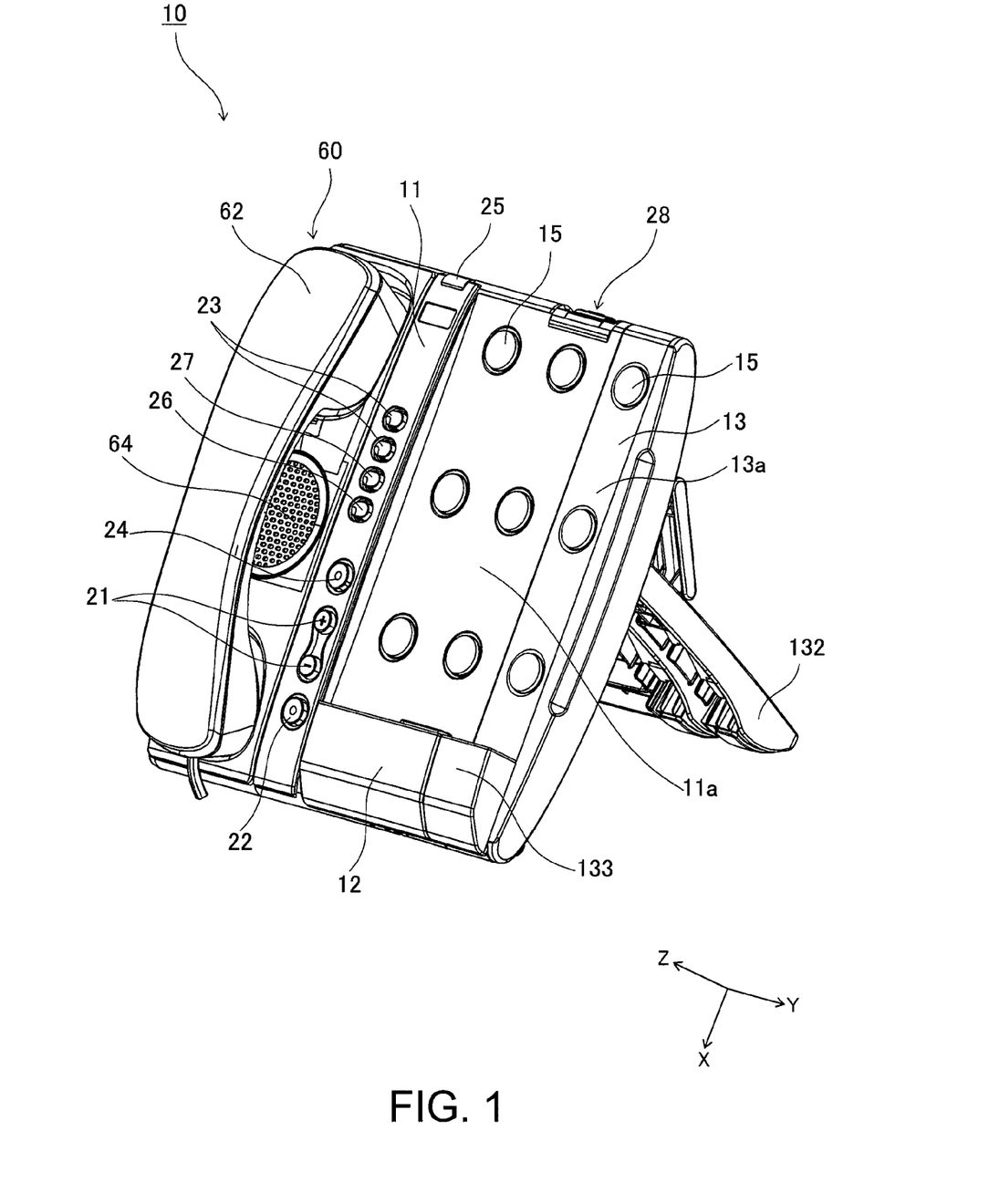
FIG. 1 is a perspective view illustrating a portable information terminal holding stand according to an embodiment of this invention.
Figure 2:
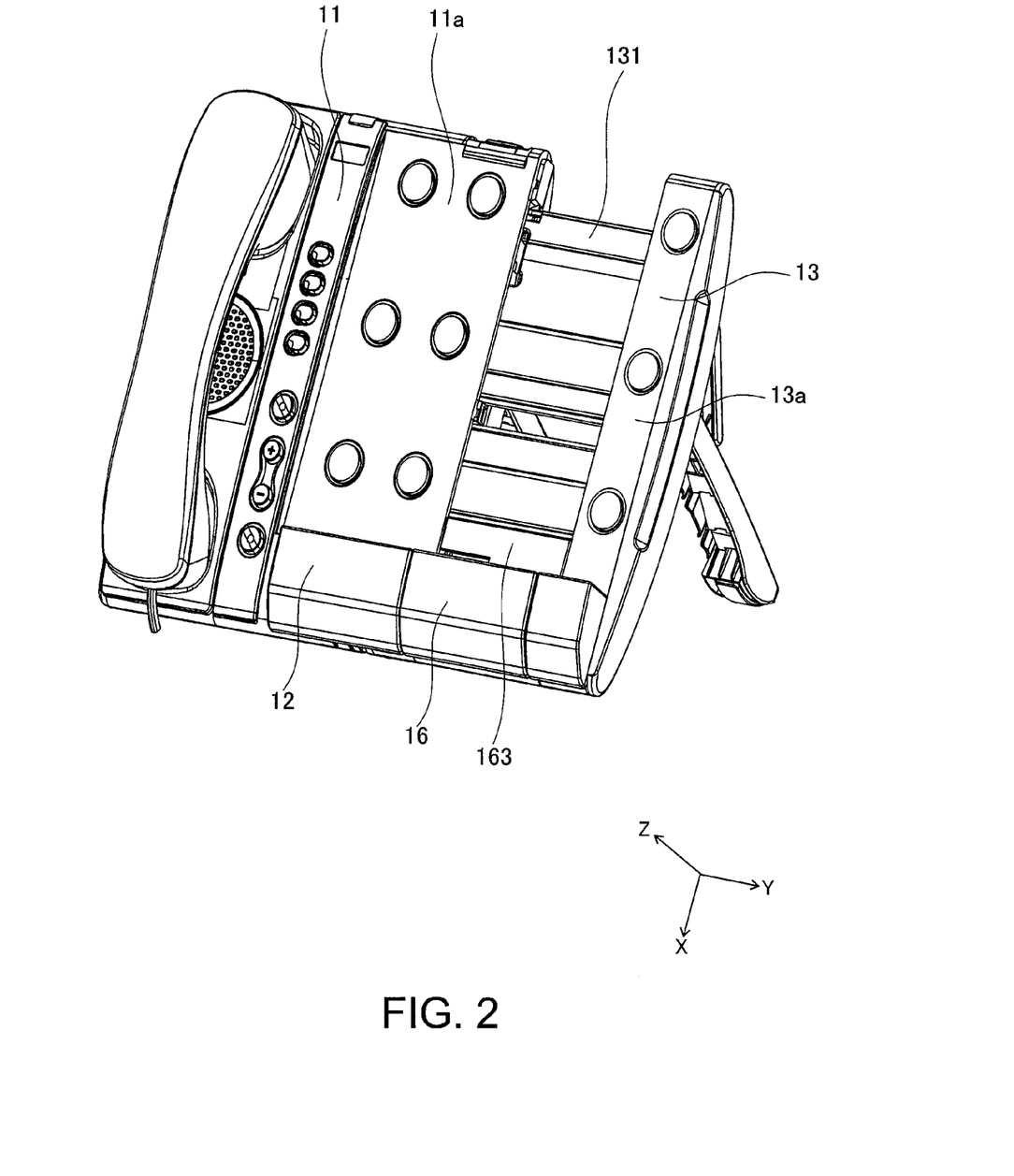
FIG. 2 is a perspective view illustrating a state in which an extensible holding member is extended, and an extensible terminal cover is mounted.

As illustrated in FIGS. 1 and 2, the portable information terminal holding stand 10 includes a holding stand main body 11 including a main mounting surface 11a inclined at a predetermined angle with respect to a horizontal surface such as a desk surface.

Figure 4:
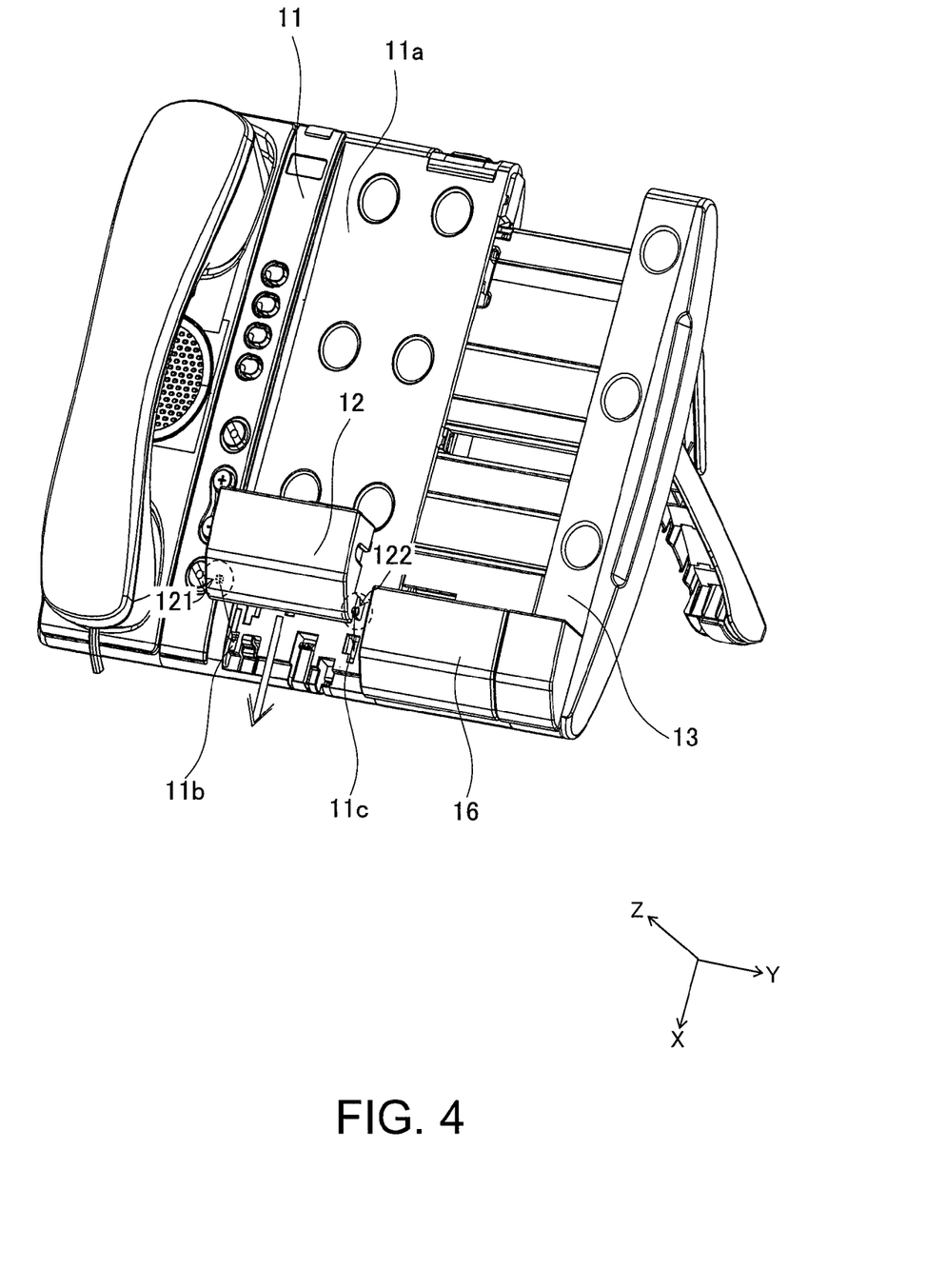
FIG. 4 is a perspective view illustrating mounting of a terminal cover.

As illustrated in FIG. 4, the holding stand main body 11 includes, at a lower portion of the holding stand main body 11, a first bearing portion 11b configured to bear a first shaft portion 121 of a terminal cover 12, and a second bearing portion 11c configured to bear a second shaft portion 122 of the terminal cover 12.

Figure 3:
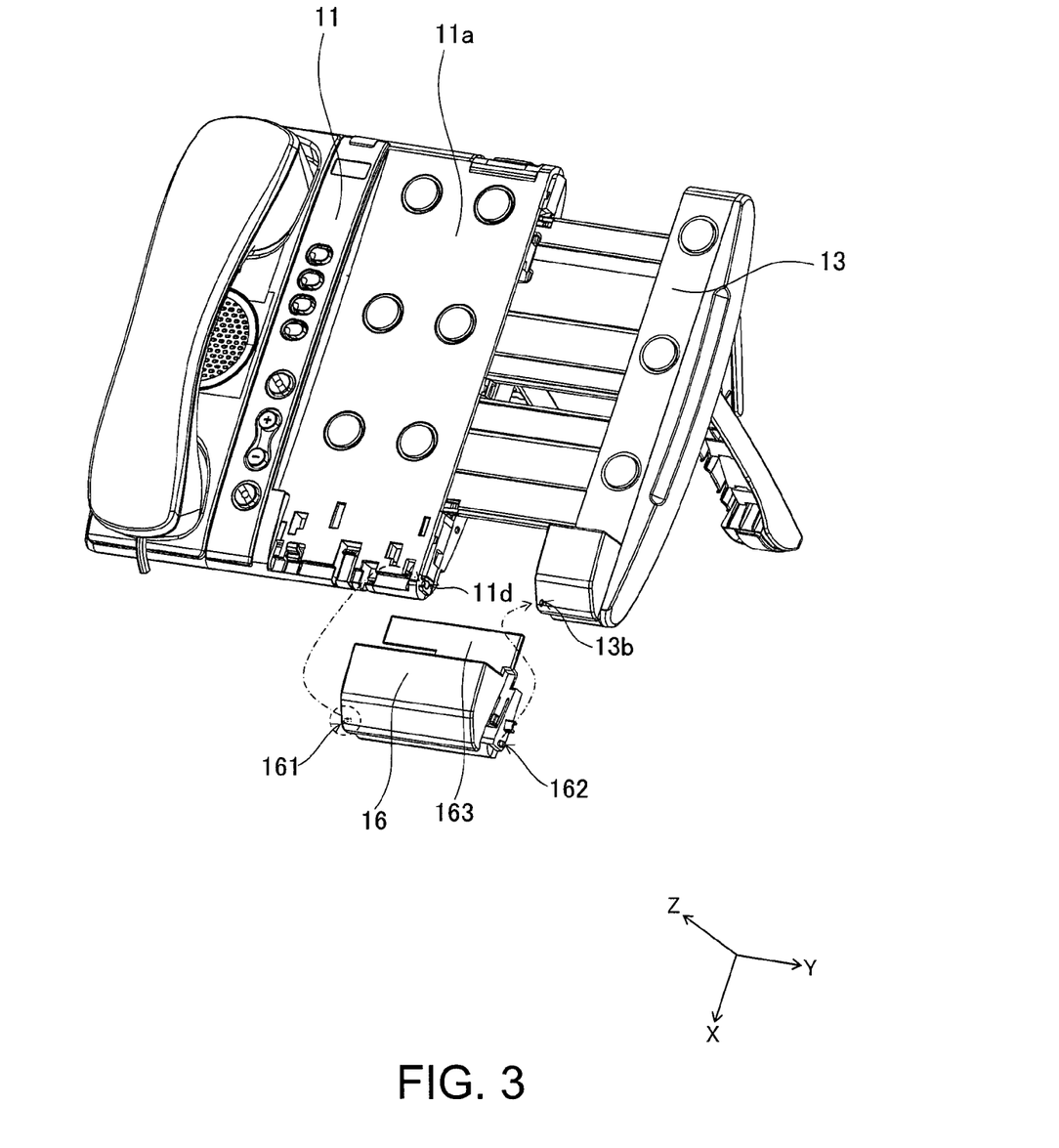
FIG. 3 is a perspective view illustrating mounting of the extensible terminal cover.

Further, as illustrated in FIG. 3, the holding stand main body 11 includes a U-shaped third bearing portion 11d configured to bear a first shaft portion 161 of an extensible terminal cover 16.

Figure 6:
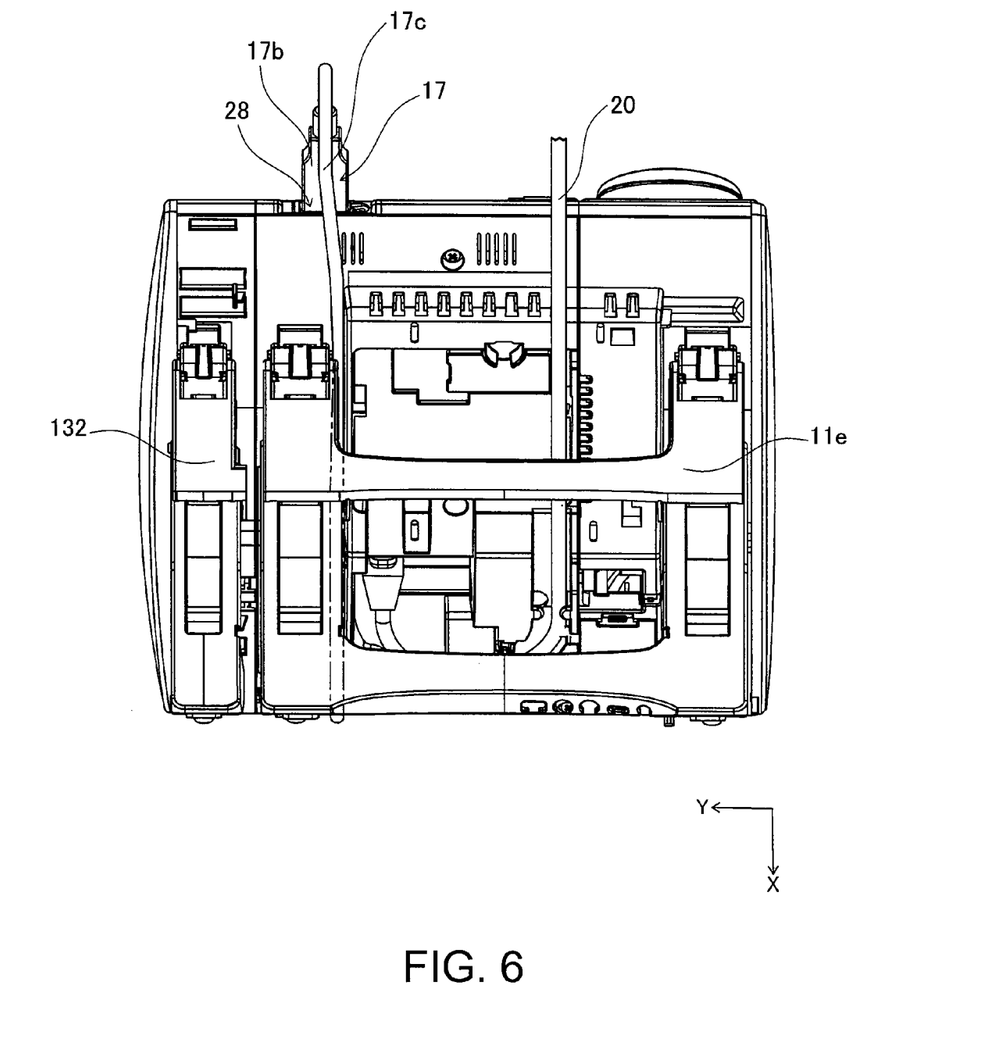
FIG. 6 is a plan view illustrating the portable information terminal holding stand as seen from a back surface side.

In addition, as illustrated in FIG. 6, the holding stand main body 11 includes, on a back surface of the holding stand main body 11, a leg 11e for supporting the holding stand main body 11. The leg 11e enables the main mounting surface 11a to be inclined at a predetermined angle with respect to the horizontal surface.

Figure 5:
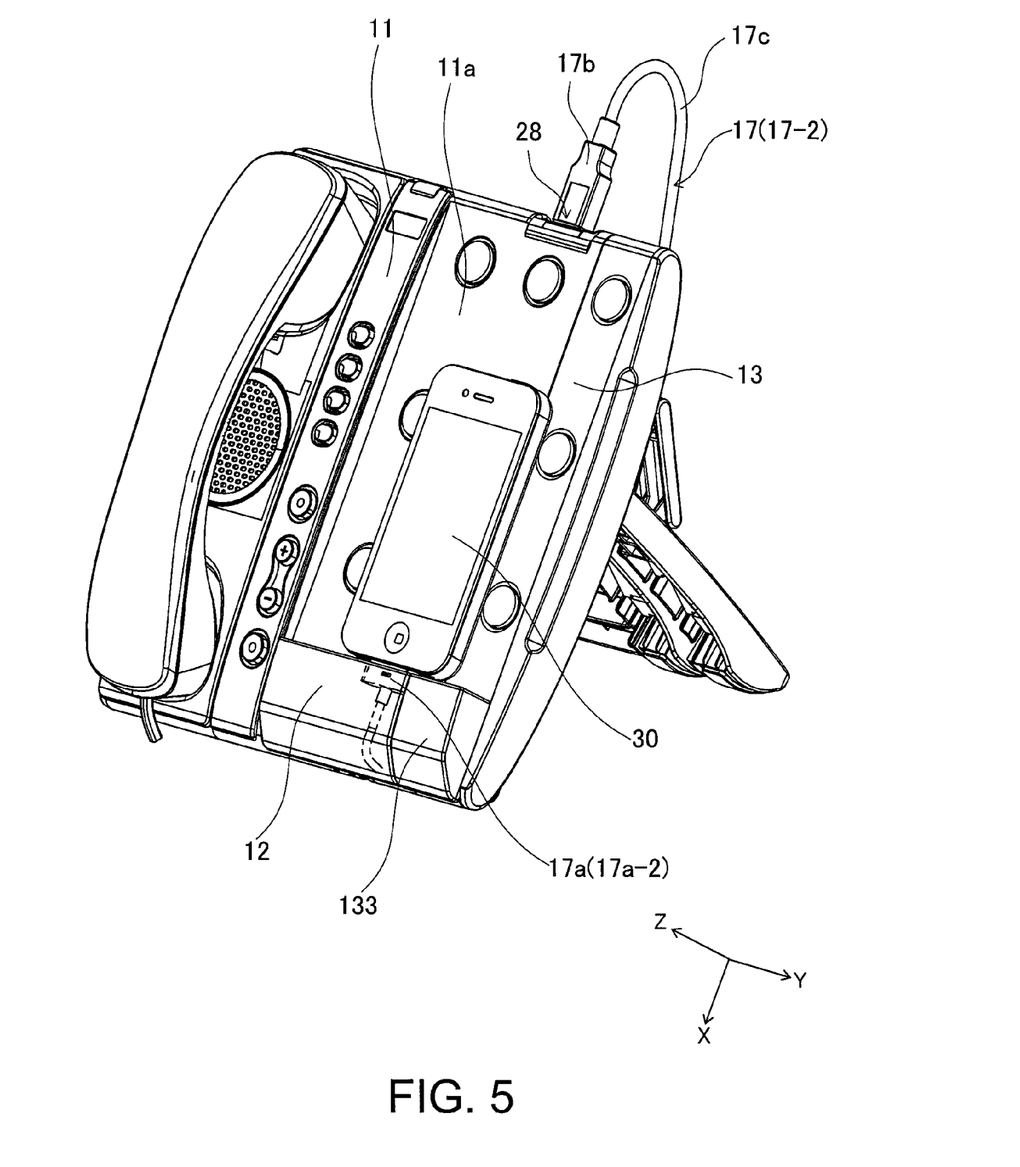
FIG. 5 is a perspective view illustrating a state in which a first portable information terminal (a smartphone) is held on the portable information terminal holding stand.
Figure 7:
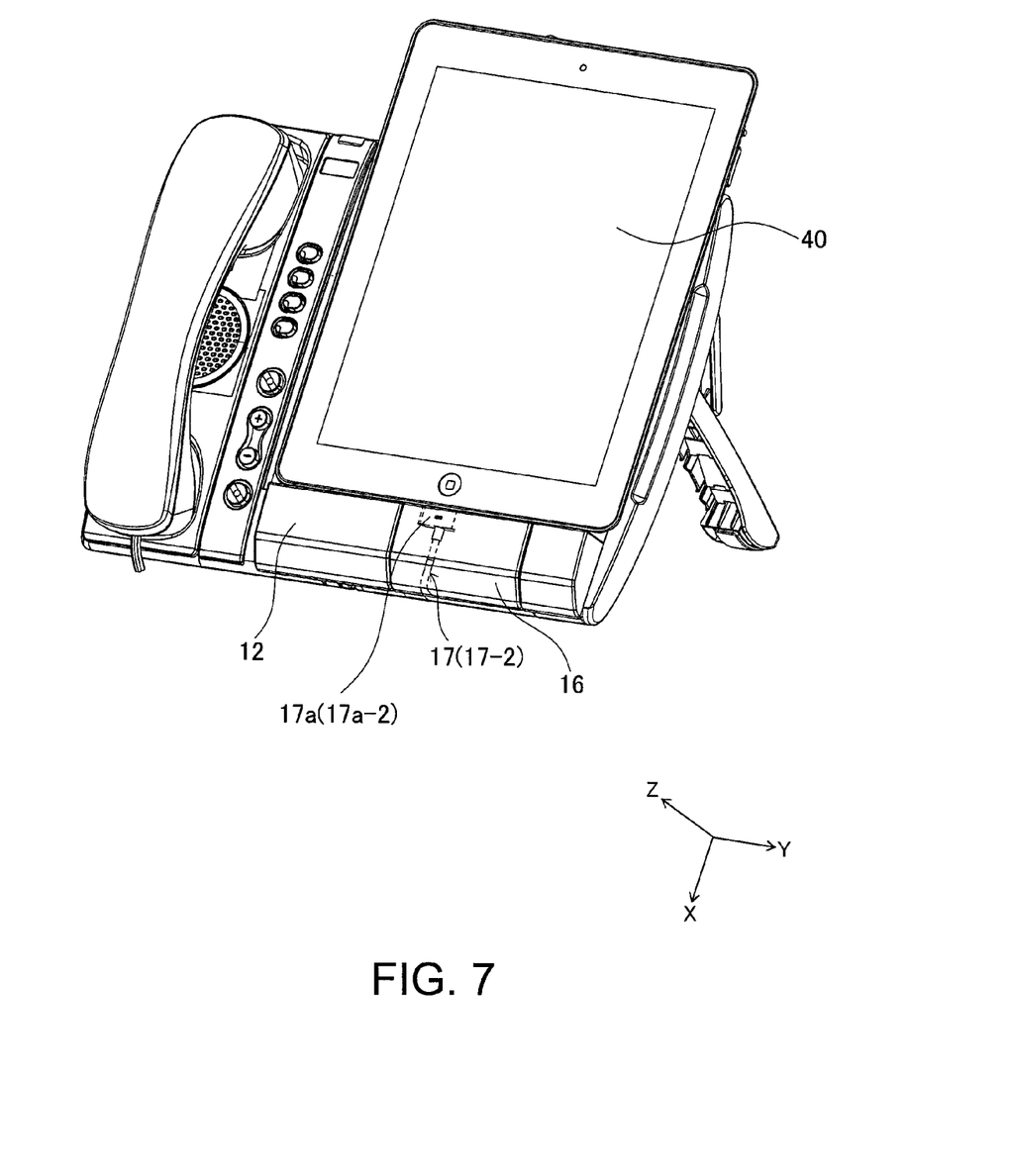
FIG. 7 is a perspective view illustrating a state in which a second portable information terminal (a tablet terminal) is held on the portable information terminal holding stand.

As illustrated in FIGS. 5 and 7, the portable information terminal holding stand 10 includes the terminal cover 12 configured to support a lower end of the portable information terminals 30 and 40 to be held on the main mounting surface 11a (and an extensible mounting surface 13a). As illustrated in FIG. 4, the terminal cover 12 is detachably attached to a lower end of the main mounting surface 11a. Further, as illustrated in FIG. 4, the terminal cover 12 includes the first shaft portion 121 protruding along the Y-axis direction from a second side edge portion (left side edge portion) of the terminal cover 12, and the second shaft portion 122 protruding along the Y-axis direction from a first side edge portion (right side edge portion) of the terminal cover 12. As illustrated in FIG. 4, the first shaft portion 121 of the terminal cover 12 is borne by the first bearing portion 11b of the holding stand main body 11 and the second shaft portion 122 of the terminal cover 12 is borne by the second bearing portion 11c of the holding stand main body 11. In addition, the terminal cover 12 is mounted to the holding stand main body 11 in such a state that the terminal cover 12 can pivot about an axis of the Y-axis direction.

Figure 8:
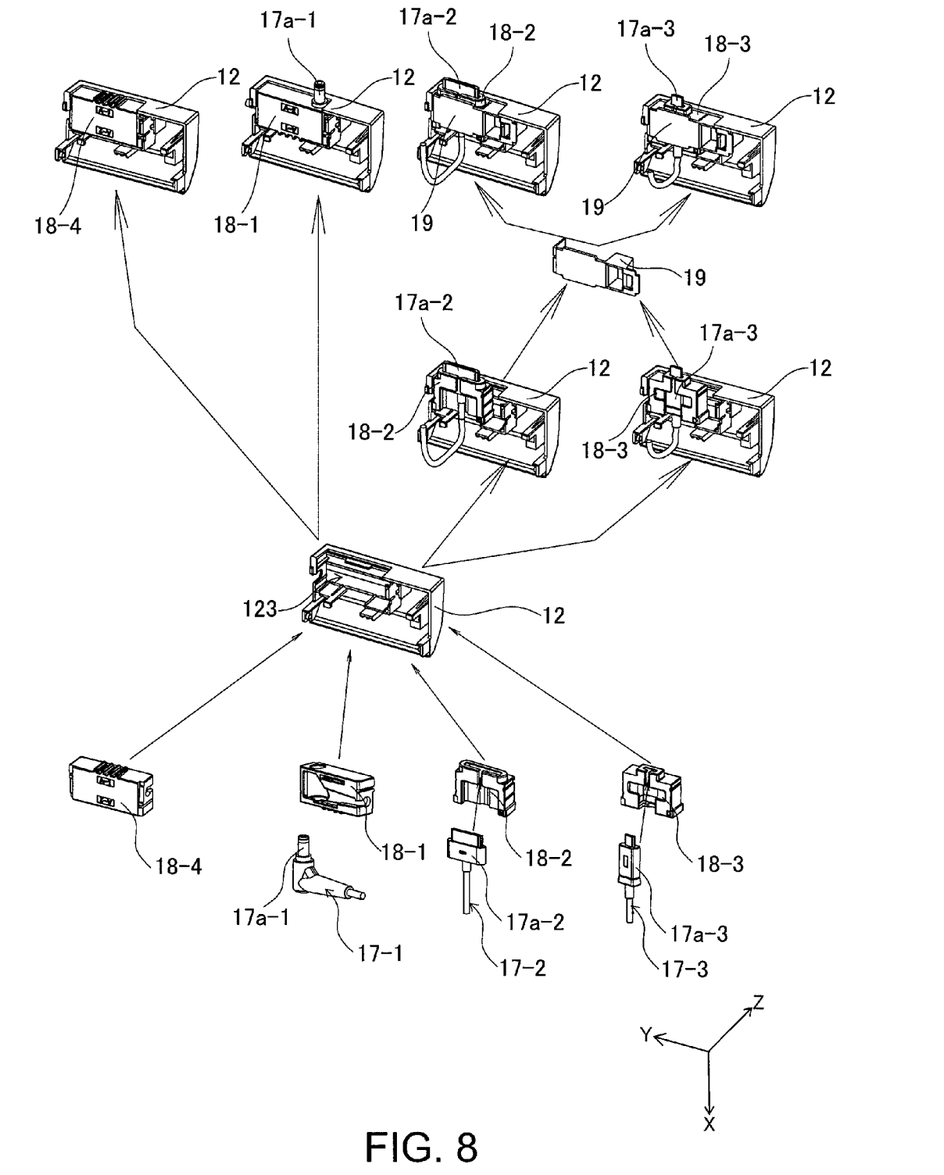
FIG. 8 is an explanatory diagram illustrating mounting of a plurality of types of connector cables to the terminal cover using a plurality of types of connector holders.

Further, the terminal cover 12 is engaged with the holding stand main body 11 as well as the first shaft portion 121 and the second shaft portion 122. Consequently, in a state in which the terminal cover 12 is mounted to the holding stand main body 11, the terminal cover 12 is capable of pivoting toward a front surface side by a predetermined angle range (in this embodiment, about 10°) while being urged toward the back surface side. As illustrated in FIG. 8, the terminal cover 12 includes a holder receiving portion 123 for holding a connector holder 18 in a fixed state.

As illustrated in FIGS. 1 and 2, the portable information terminal holding stand 10 includes an extensible holding member 13 provided on a first side edge portion side (in the example of the figures, on a right edge portion side) of the holding stand main body 11. As illustrated in FIG. 2, the extensible holding member 13 includes a slide plate 131 that is slidable inside the holding stand main body 11 in a direction away from the holding stand main body 11 (in the example of the figure, in a rightward direction). As illustrated in FIGS. 1 and 2, the extensible holding member 13 has the extensible mounting surface 13a that is arranged in parallel to and in the same plane as the main mounting surface 11a. The extensible holding member 13 includes a leg 132 similar to the leg 11e (FIG. 6) of the holding stand main body 11 on a back surface of the extensible holding member 13. The leg 132 enables the extensible mounting surface 13a to be inclined at a predetermined angle with respect to the horizontal surface. The extensible holding member 13 includes a stopper 133 for supporting the lower end of the portable information terminals 30 and 40. As illustrated in FIG. 3, the extensible holding member 13 includes, at a lower portion of a second side edge portion (left side edge portion) of the extensible holding member 13, a bearing portion 13b configured to bear a second shaft portion 162 of the extensible terminal cover 16.

The portable information terminal holding stand 10 includes cushions 15 formed from an elastic and slightly adhesive material. As illustrated in FIG. 1, the cushions 15 are arranged on the main mounting surface 11a and the extensible mounting surface 13a. By thus providing the cushions 15 on the main mounting surface 11a and the extensible mounting surface 13a, differences in the size of the portable information terminals 30 and 40 in the thickness direction (Z-axis direction) can be handled, and the portable information terminals 30 and 40 can be prevented from falling. In the example of the figure, six cushions 15 are arranged on the main mounting surface 11a, and three cushions 15 are arranged on the extensible mounting surface 13a. However, the number of cushions 15 may be freely set.

As illustrated in FIGS. 2 and 3, the portable information terminal holding stand 10 includes the extensible terminal cover 16 to be detachably attached to a lower end of the slide plate 131 at a position between the main mounting surface 11a and the extensible mounting surface 13a when the extensible holding member 13 is extended to a predetermined extension position. As illustrated in FIG. 3, the extensible terminal cover 16 includes the first shaft portion 161 protruding along the Y-axis direction from a second side edge portion (left side edge portion) of the extensible terminal cover 16, and the second shaft portion 162 protruding along the Y-axis direction from a first side edge portion (right side edge portion) of the extensible terminal cover 16. As illustrated in FIG. 3, the first shaft portion 161 of the extensible terminal cover 16 is borne by the third bearing portion 11d of the holding stand main body 11 and the second shaft portion 162 of the extensible terminal cover 16 is borne by the bearing portion 13b of the extensible holding member 13, with this, the extensible terminal cover 16 is mounted to the extensible holding member 13 and the holding stand main body 11 in such a state that the extensible terminal cover 16 can pivot about an axis of the Y-axis direction. Further, in addition to the first shaft portion 161 and the second shaft portion 162, the extensible terminal cover 16 is engaged with at least one of the extensible holding member 13 and the holding stand main body 11. Consequently, in a state in which the extensible terminal cover 16 is mounted to the extensible holding member 13 and the holding stand main body 11, the extensible terminal cover 16 is capable of pivoting toward the front surface side by a predetermined angle range (in this embodiment, about 10°) while being urged toward the back surface side.

As illustrated in FIG. 2, the extensible terminal cover 16 includes an auxiliary mounting surface 163 that is arranged in parallel to and in the same plane as the main mounting surface 11a of the holding stand main body 11 and the extensible mounting surface 13a of the extensible holding member 13 in a state in which the extensible terminal cover 16 is mounted to the extensible holding member 13 and the holding stand main body 11.

As illustrated in FIG. 1, the portable information terminal holding stand 10 includes a transmission/reception section 60 that is integrally provided with the holding stand main body 11 at a second side edge portion side (in the example of the figure, on a left edge portion side) of the holding stand main body 11, to thereby cause the portable information terminal holding stand 10 to function as a desk telephone. As illustrated in FIG. 1, the transmission/reception section 60 includes a handset 62, a loudspeaker 64, and a speech circuit component (not shown). The portable information terminal holding stand 10 including the transmission/reception section 60 is usable as an internet protocol (IP) phone compliant with the RFC-3261 protocol, and has a fixed directory number assigned to the IP phone. However, in this embodiment, because the portable information terminal holding stand 10 does not include dial buttons, the portable information terminal holding stand 10 can only receive incoming calls. Reference numeral 20 in FIG. 6 denotes a LAN cable 20 for an IP phone.

As illustrated in FIG. 1, the portable information terminal holding stand 10 includes volume buttons 21, a speaker button 22, a plurality of function buttons 23, a microphone button 24, an incoming call lamp 25, a speech switch button 26, and a Bluetooth® module linking button 27 at the second side edge portion (in the example of the figure, on the left edge portion) of the holding stand main body 11.

The Bluetooth module linking button 27 is a button for linking the first portable information terminal 30 and the portable information terminal holding stand 10 by Bluetooth communication. In other words, the first portable information terminal 30 has well-known Bluetooth installed thereon. On the other hand, the portable information terminal holding stand 10 has a Bluetooth module (not shown) installed thereon. Therefore, when the first portable information terminal 30 is placed on the portable information terminal holding stand 10, and the Bluetooth module linking button 27 is depressed, the user can do a speech using the handset 62. In this case, the speech operation is performed by the first portable information terminal 30.

The speech switch button 26 is a button for switching a speech between the first portable information terminal 30 and the portable information terminal holding stand 10. In other words, the speech switch button 26 is depressed in a state in which the first portable information terminal 30 and the portable information terminal holding stand 10 are linked by Bluetooth communication so that the speech can be continued by the use of the first portable information terminal 30 without any interruption of the speech. Thus, the speech is continued by the use of the portable information terminal holding stand 10 including the transmission/reception section 60.

The portable information terminal holding stand 10 includes a connector 28. As illustrated in FIG. 1, the connector 28 is formed on an upper end edge portion of the holding stand main body 11. The connector 28 is configured so that a second connector 17b (FIG. 5) of a connector cable 17 is inserted and fitted into the connector 28. The connector 28 is connected to a commercial power supply (not shown) via a power supply circuit (not shown) in the portable information terminal holding stand 10 and a cable (not shown).

The portable information terminal holding stand 10 includes the connector cable 17 and a connector holder 18 (FIG. 8).

As illustrated in FIGS. 5 and 6, the connector cable 17 includes a first connector 17a to be connected to a terminal side connector (not shown) of the first portable information terminal 30, a second connector 17b to be connected to the connector 28, and a cable 17c connecting the first connector 17a and the second connector 17b. It is to be noted that, in this embodiment, although the second connector 17b is specified by a USB connector, the second connector 17b is practically not limited to the illustrated USB connector. A secondary battery (lithium ion battery) built into the portable information terminals 30 and 40 can be charged by electrically connecting the portable information terminal holding stand 10 to the portable information terminals 30 and 40 with the connector cable 17. In addition, the connector cable 17 may also be used for other applications, such as data transfer between the portable information terminal holding stand 10 and the portable information terminals 30 and 40.

As illustrated in FIG. 8, a plurality of types of connector cables 17 are prepared in accordance with the specifications of the terminal side connectors (not shown) of the plurality of types of portable information terminals 30 and 40. Specifically, in this embodiment, as illustrated in FIG. 8, provision is made of a connector cable 17-1 having, as a first connector 17*a*-1, a DC jack for an AC/DC adapter (not shown) on a tip portion, a connector cable 17-2 having, as a first connector 17*a*-2, a dock connector on a tip portion, and a connector cable 17-3 having, as a first connector 17*a*-3, a mini USB connector on a tip portion. The connector cable 17 is not limited to the above-mentioned examples and may be practically structured by various types of connector cables.

As illustrated in FIG. 8, the connector holder 18, which holds the first connector 17*a* of the connector cable 17, is mounted in a fixed state to the terminal cover 12 or the extensible terminal cover 16. In FIG. 8, the first connector 17*a* is fixed to the terminal cover 12 using the connector holder 18. Here, a state of fixing the first connector 17*a* to the extensible terminal cover 16 using the connector holder 18 is the same as the state of fixing of the first connector 17*a* to the terminal cover 12 using the connector holder 18 illustrated in FIG. 8, and hence illustration and description would be omitted here.

As illustrated in FIG. 8, a plurality of types of connector holders 18 are prepared in accordance with the specifications of the first connector 17*a* of the connector cable 17. Specifically, in this embodiment, as illustrated in FIG. 8, provision is made of an AC/DC type connector holder 18-1 configured to hold the first connector (DC jack) 17*a*-1, a docking type connector holder 18-2 configured to hold the first connector (dock connector) 17*a*-2, and a mini USB type connector holder 18-3 configured to hold the first connector (mini USB connector) 17*a*-3.

In addition, in this embodiment, as illustrated in FIG. 7, when the first connector 17*a* is mounted to the extensible terminal cover 16, provision is also made about a blank type connector holder 18-4 which is mounted to the terminal cover 12 and which embeds the holder receiving portion 123 of the terminal cover 12.

In this embodiment, when the first connector 17*a* is mounted to the terminal cover 12 using the connector holders 18-1 and 18-2, as illustrated in FIG. 8, a holder support 19 is used, which is mounted in a fixed state to the terminal cover 12. The holder support 18 is mounted to the terminal cover 12 in cooperation with the connector holders 18-1 and 18-2 to mount the first connectors 17*a*-1 and 17*a*-2 to the terminal cover 12.

Next, a procedure of holding the first portable information terminal 30 with the portable information terminal holding stand 10 is described below.

First, a user selects the appropriate connector cable 17 and connector holder 18 in accordance with the specifications of the terminal side connector (not shown) of the first portable information terminal 30. It is assumed in the example illustrated in FIG. 5 that the connector cable 17-2 having the first connector (dock connector) 17*a*-2 and the dock type connector holder 18-2 are selected.

Next, as illustrated in FIG. 8, the user fits the first connector 17*a*-2 into the connector holder 18-2, and then using the holder support 19, fixes the connector holder 18-2 to the holder receiving portion 123 of the terminal cover 12.

Next, the user fits the first shaft portion 121 of the terminal cover 12 into the first bearing portion 11*b* of the holding stand main body 11 from the front surface side, and fits the second shaft portion 122 of the terminal cover 12 into the second bearing portion 11*c* of the holding stand main body 11 from the front surface side. Thus, the terminal cover 12 is mounted to the holding stand main body 11.

Next, as illustrated in FIG. 5, the user puts the first portable information terminal 30 on the portable information terminal holding stand 10 so that the terminal side connector (not shown) of the first portable information terminal 30 is inserted into the first connector 17*a*-2. At this time, the terminal cover 12 is pivotably or rotatably mounted relative to the holding stand main body 11. Hence the connector holder 18-2 and the first connector 17*a*-2 pivot together with the terminal cover 12. Consequently, even if there is relative posture deviation between the first connector 17*a*-2 and the terminal side connector (not shown) of the first portable information terminal 30, a smooth engagement between the first connector 17*a*-2 and the terminal side connector (not shown) of the first portable information terminal 30 can be realized.

Next, a procedure of holding the second portable information terminal 40 with the portable information terminal holding stand 10 is described below.

First, a user selects the appropriate connector cable 17 and connector holder 18 in accordance with the specifications of the terminal side connector (not shown) of the second portable information terminal 40. In the example illustrated in FIG. 7, the connector cable 17-2 having the first connector (dock connector) 17*a*-2 and the dock type connector holder 18-2 are selected.

Next, as illustrated in FIG. 8, the user fits the first connector 17*a*-2 into the connector holder 18-2, and then mounts the connector holder 18-2 to a holder receiving portion (not shown) of the extensible terminal cover 16 by the use of the holder support 19. Further, the user mounts the blank type connector holder 18-4 to the holder receiving portion 123 of the terminal cover 12.

Next, the user extends the extensible holding member 13 to a predetermined extension position with respect to the holding stand main body 11. Thereafter, the user inserts, from the front surface side, the second shaft portion 162 of the extensible terminal cover 16 along the Y-axis direction into the bearing portion 13*b* of the extensible holding member 13 as illustrated in FIG. 3. Thus, the first shaft portion 161 of the extensible terminal cover 16 is fitted into the third bearing portion 11*d* of the holding stand main body 11 from the front surface side. Thereby, the extensible terminal cover 16 is mounted to the extensible holding member 13 and the holding stand main body 11. Further, as illustrated in FIG. 4, the user fits the first shaft portion 121 of the terminal cover 12 into the first bearing portion 11*b* of the holding stand main body 11 from the front surface side, and fits the second shaft portion 122 of the terminal cover 12 into the second bearing portion 11*c* of the holding stand main body 11 from the front surface side. Thus, the terminal cover 12 is mounted to the holding stand main body 11.

Next, as illustrated in FIG. 7, the user puts the second portable information terminal 40 on the portable information terminal holding base 10 so that the terminal side connector (not shown) of the second portable information terminal 40 is inserted into the first connector 17*a*-2. At this time, the extensible terminal cover 16 pivotably mounted to the extensible holding member 13 and the holding stand main body 11 allows the connector holder 18-2 and the first connector 17*a*-2 to pivot together with the terminal cover 12. Consequently, even if there is relative posture deviation between the first connector 17a-2 and the terminal side connector (not shown) of the second portable information terminal 40, a smooth engagement between the first connector 17a-2 and the terminal side connector (not shown) of the second portable information terminal 40 can be realized.

For the thus-obtained portable information terminal holding stand 10 according to this embodiment, a plurality of types of connector holders 18 are prepared in accordance with the specifications of the first connector 17a to be connected to the terminal side connectors (not shown) of the portable information terminals 30 and 40. Therefore, the first connector 17a and the connector holder 18 are selected in accordance with the connector specifications of the portable information terminals 30 and 40. As a result, the appropriate first connector 17a can be easily mounted to the portable information terminal holding stand 10 by the use of the selected connector holder 18. Consequently, the portable information terminal holding stand 10 according to this embodiment is capable of easily handling a plurality of types of portable information terminals 30 and 40 having different connector specifications to each other.

Further, the holder receiving portion 123 (FIG. 8) is formed in the terminal cover 12 detachably attached to the lower end of the main mounting surface 11a and receives and holds the connector holder 18. Therefore, the connector holder 18 can be exchanged from the main mounting surface 11a side, in order words, the front surface side of the portable information terminal holding stand 10. Employing such a configuration allows the first connector 17a to be easily exchanged with little effort without lifting up or without turning over the portable information terminal holding stand 10.

In addition, similar to the terminal cover 12, the holder receiving portion (not shown) configured to receive and hold the connector holder 18 is also formed in the extensible terminal cover 16. With this configuration, when the portable information terminals 30 and 40 would be held by extending the extensible holding member 13 to an extension position, the first connector 17a and the connector holder 18 can be selected in accordance with the specifications of the portable information terminals 30 and 40. Further, the appropriate first connector 17a can be simply mounted to the extensible terminal cover 16 using the selected connector holder 18.

Further, the extensible terminal cover 16 can be detachably attached to the front surface side of the portable information terminal holding stand 10. Consequently, even when the portable information terminals 30 and 40 would be held by extending the extensible holding member 13 to an extension position, the extensible terminal cover 16 can be detachable without lifting up or without turning over the portable information terminal holding stand 10. Thus, the first connector 17a can be easily exchanged with little effort.

In addition, a structure of mounting the first connector 17a to the terminal cover 12 or the extensible terminal cover 16 via the connector holder 18 is employed. In this structure, the installation position of the first connector 17a with respect to the terminal cover 12 or the extensible terminal cover 16 can be easily adjusted by selecting the appropriate connector holder 18 in accordance with the position of the terminal side connector (not shown).

Further, a holding state is formed by holding the portable information terminals 30 and 40 and by mounting the portable information terminals 30 and 40 on the main mounting surface 11a and the extensible mounting surface 13a that are inclined with respect to the horizontal surface. Consequently, the portable information terminals 30 and 40 can be freely held at a preferred position of the user.

In addition, the extensible holding member 13 is capable of sliding with respect to the holding stand main body 11. In this configuration, the mounting surfaces (main mounting surface 11a and extensible mounting surface 13a) on which the portable information terminals 30 and 40 are to be mounted can be extended in the right-and-left direction (Y-axis direction). This structure makes it possible to appropriately hold the portable information terminals 30 and 40 having different length and width dimensions.

Further, the terminal cover 12 is pivotably mounted to the holding stand main body 11. Therefore, when the first connector 17a is fitted into and released from the terminal side connector (not shown) of the first portable information terminal 30, the connector holder 18 and the first connector 17a pivot together with the terminal cover 12. Consequently, the smooth fitting and release between the first connector 17a and the terminal side connector (not shown) of the first portable information terminal 30 can be realized. Thus, excessive force can be prevented from acting on the first connector 17a and the terminal side connector (not shown), and damage to the first connector 17a and the terminal side connector (not shown) can be prevented.

In addition, similarly, the extensible terminal cover 16 is pivotably mounted to the extensible holding member 13 and the holding stand main body 11. With this configuration, smooth fitting and release between the first connector 17a and the terminal side connector (not shown) of the second portable information terminal 40 can be realized. Thus, excessive force can be prevented from acting on the first connector 17a and the terminal side connector (not shown), and damage to the first connector 17a and the terminal side connector (not shown) can be prevented.

Further, the terminal cover 12 and the extensible terminal cover 16 are configured so as to include both a function of covering and protecting the first connector 17a and a function of supporting the lower end of the portable information terminals 30 and 40 placed on the mounting surfaces (main mounting surface 11a and extensible mounting surface 13a). Consequently, the structure of the portable information terminal holding stand 10 can be simplified.

This invention has been described above with reference to the embodiment, but this invention is not limited to the above-mentioned embodiment. Various modifications understandable for those skilled in the art would be possible in connection with the configurations and details of this invention within the scope of this invention.

For example, in the above-mentioned embodiment, exemplary description has been given of the case of holding one of the two types of portable information terminals including the first portable information terminal 30 and the second portable information terminal 40. Those skilled in the art may easily arrive at such a modification that would hold one portable information terminal selected from three or more types.

REFERENCE SIGNS LIST

10 . . . portable information terminal holding stand
11 . . . holding stand main body
11a . . . main mounting surface
11b . . . first bearing portion
11c . . . second bearing portion
11d . . . third bearing portion
11e . . . leg
12 . . . terminal cover
121 . . . first shaft portion
122 . . . second shaft portion
123 . . . holder receiving portion 13 ... extensible holding member
13a ... extensible mounting surface
13b ... bearing portion
131 ... slide plate
132 ... leg
133 ... stopper
15 ... cushion
16 ... extensible terminal cover
161 ... first shaft portion
162 ... second shaft portion
163 ... auxiliary mounting surface
17 ... connector cable
17a ... first connector (holding stand side connector)
17b ... second connector
17c ... cable
18 ... connector holder
19 ... holder support
20 ... LAN cable
21 ... volume button
22 ... speaker button
23 ... function button
24 ... microphone button
25 ... incoming call lamp
26 ... speech switch button
27 ... Bluetooth module linking button
28 ... connector
30 ... first portable information terminal
40 ... second portable information terminal
60 ... transmission/reception section
62 ... handset
64 ... loudspeaker

The invention claimed is:

1. A portable information terminal holding stand configured to hold one of a plurality of types of portable information terminals including at least a first portable information terminal comprising a terminal side connector and a second portable information terminal comprising a terminal side connector having different specifications from the specifications of the terminal side connector of the first portable information terminal, the portable information terminal holding stand being configured to be electrically connected to the one of the plurality of types of portable information terminals by fitting a holding stand side connector into the terminal side connector of one of the plurality of types of portable information terminals held thereon, the portable information terminal holding stand comprising:
a holding stand main body having a main mounting surface inclined with respect to a horizontal surface;
a terminal cover detachably attached to a lower end of the main mounting surface and configured to support a lower end of the one of the plurality of types of portable information terminals mounted on the main mounting surface; and
a connector holder configured to hold the holding stand side connector,
the connector holder comprising a plurality of types of connector holders prepared in accordance with specifications of the holding stand side connector,
the terminal cover comprising a holder receiving portion configured to receive and hold one of the plurality of types of connector holders.

2. A portable information terminal holding stand according to claim 1, further comprising:

an extensible holding member comprising a slide plate slidable inside the holding stand body, and an extensible mounting surface movable in parallel to the main mounting surface; and
an extensible terminal cover to be detachably attached to a lower end of the slide plate at a position between the main mounting surface and the extensible mounting surface when the extensible holding member is extended to a predetermined extension position,
wherein the extensible terminal cover comprises a holder receiving portion configured to receive and hold the one of the plurality of types of connector holders.

3. A portable information terminal holding stand according to claim 2, wherein the extensible terminal cover is pivotably arranged on the holding stand main body and the extensible holding member.

4. A portable information terminal holding stand according to claim 3,
wherein the extensible terminal cover comprises a pair of shaft portions protruding from both side portions of the extensible terminal cover along a direction of a pivot axis of the extensible terminal cover,
wherein the holding stand main body and the extensible holding member each comprise a bearing portion, and
wherein the extensible terminal cover is configured to be mounted to the holding stand main body and the extensible holding member by respectively fitting the shaft portions of the extensible terminal cover into the bearing portion of the holding stand main body and the bearing portion of the extensible holding member from the main mounting surface side and the extensible mounting surface side.

5. A portable information terminal holding stand according to claim 2, wherein the extensible holding member comprises a stopper configured to support the lower end of the one of the plurality of types of portable information terminals when the extensible holding member is extended to the predetermined extension position.

6. A portable information terminal holding stand according to claim 2, further comprising a cushion arranged on the extensible mounting surface.

7. A portable information terminal holding stand according to claim 1, wherein the terminal cover is pivotably arranged on the holding stand main body.

8. A portable information terminal holding stand according to claim 7,
wherein the terminal cover comprises a pair of shaft portions protruding from both side portions of the terminal cover along a direction of a pivot axis of the terminal cover,
wherein the holding stand main body comprises a pair of bearing portions, and
wherein the terminal cover is configured to be mounted to the holding stand main body by fitting the shaft portions of the terminal cover into the bearing portions of the holding stand main body from the main mounting surface side.

9. A portable information terminal holding stand according to claim 1, further comprising a cushion arranged on the main mounting surface.

10. A desk telephone, including:
the portable information terminal holding stand according to claim 1; and
a reception section.

* * * * *